US011112028B2

(12) United States Patent
Kusmertz et al.

(10) Patent No.: US 11,112,028 B2
(45) Date of Patent: Sep. 7, 2021

(54) VALVE INCLUDING A VALVE STEM WITH A COMBINATION THREADED AND SPLINED SECTION

(71) Applicant: FMC Technologies, Inc., Houston, TX (US)

(72) Inventors: Cameron Hackney Kusmertz, Willis, TX (US); Zac Michael LeBlanc, Fulshear, TX (US)

(73) Assignee: FMC Technologies, Inc., Houston, TX (US)

( * ) Notice: Subject to any disclaimer, the term of this patent is extended or adjusted under 35 U.S.C. 154(b) by 51 days.

(21) Appl. No.: 16/085,864

(22) PCT Filed: Mar. 22, 2016

(86) PCT No.: PCT/US2016/023562
§ 371 (c)(1),
(2) Date: Sep. 17, 2018

(87) PCT Pub. No.: WO2017/164845
PCT Pub. Date: Sep. 28, 2017

(65) Prior Publication Data
US 2020/0049274 A1 Feb. 13, 2020

(51) Int. Cl.
*F16K 31/50* (2006.01)
(52) U.S. Cl.
CPC ................... *F16K 31/50* (2013.01)
(58) Field of Classification Search
CPC .......... F16K 31/50; F16K 1/50; F16K 31/508; F16K 3/246
See application file for complete search history.

(56) References Cited

U.S. PATENT DOCUMENTS

| 3,409,271 | A | * | 11/1968 | Kallenbach | ............... | F16K 1/52 |
| | | | | | | 251/265 |
| 4,844,407 | A | | 7/1989 | Baker | | |
| 5,120,020 | A | | 6/1992 | Laue | | |
| 6,162,208 | A | * | 12/2000 | Hipps | ................... | A61F 2/2427 |
| | | | | | | 128/899 |
| 6,354,261 | B1 | * | 3/2002 | Lassiter | ................ | B60K 28/14 |
| | | | | | | 123/198 D |

(Continued)

FOREIGN PATENT DOCUMENTS

| DE | 413049 A | 5/1925 |
| WO | 2010/104657 A1 | 9/2010 |

OTHER PUBLICATIONS

International Search Report and Written Opinion from PCT/US2016/023562 dated Dec. 16, 2016.

*Primary Examiner* — Kelsey E Cary
(74) *Attorney, Agent, or Firm* — Osha Bergman Watanabe & Burton LLP

(57) ABSTRACT

One illustrative embodiment of a valve disclosed herein comprises a body (12), a valve stem (22) that comprises a combination threaded-splined section (22X) and an unthreaded section (22Y) wherein the combination threaded-splined section (22X) comprises at least one spline (22S) and a thread (22Z). The valve (10) also comprises an anti-rotation ring (26) that includes at least one tab (26T) positioned in the at least one spline (22S) of the combination threaded-splined section (22X) and a threaded drive nut (24) that is adapted to engage the thread (22Z) of the combination threaded-splined section (22X).

24 Claims, 16 Drawing Sheets

(56) References Cited

U.S. PATENT DOCUMENTS

| | | |
|---|---|---|
| 6,791,215 B2 | 9/2004 | Tesar |
| 6,929,238 B2 | 8/2005 | Bartell, Jr. et al. |
| 7,249,748 B2 | 7/2007 | Bartell, Jr. et al. |
| 8,465,000 B2 | 6/2013 | Bartell, Jr. et al. |
| 8,776,818 B2 | 7/2014 | Gerber |
| 2007/0163480 A1 | 7/2007 | Cotton |
| 2008/0061257 A1 | 3/2008 | Bartell, Jr. et al. |
| 2013/0133448 A1 | 5/2013 | Schroeder et al. |
| 2015/0069275 A1 | 3/2015 | Herman et al. |
| 2015/0362079 A1* | 12/2015 | Nguyen ............... F16K 31/145 |
| | | 251/318 |

* cited by examiner

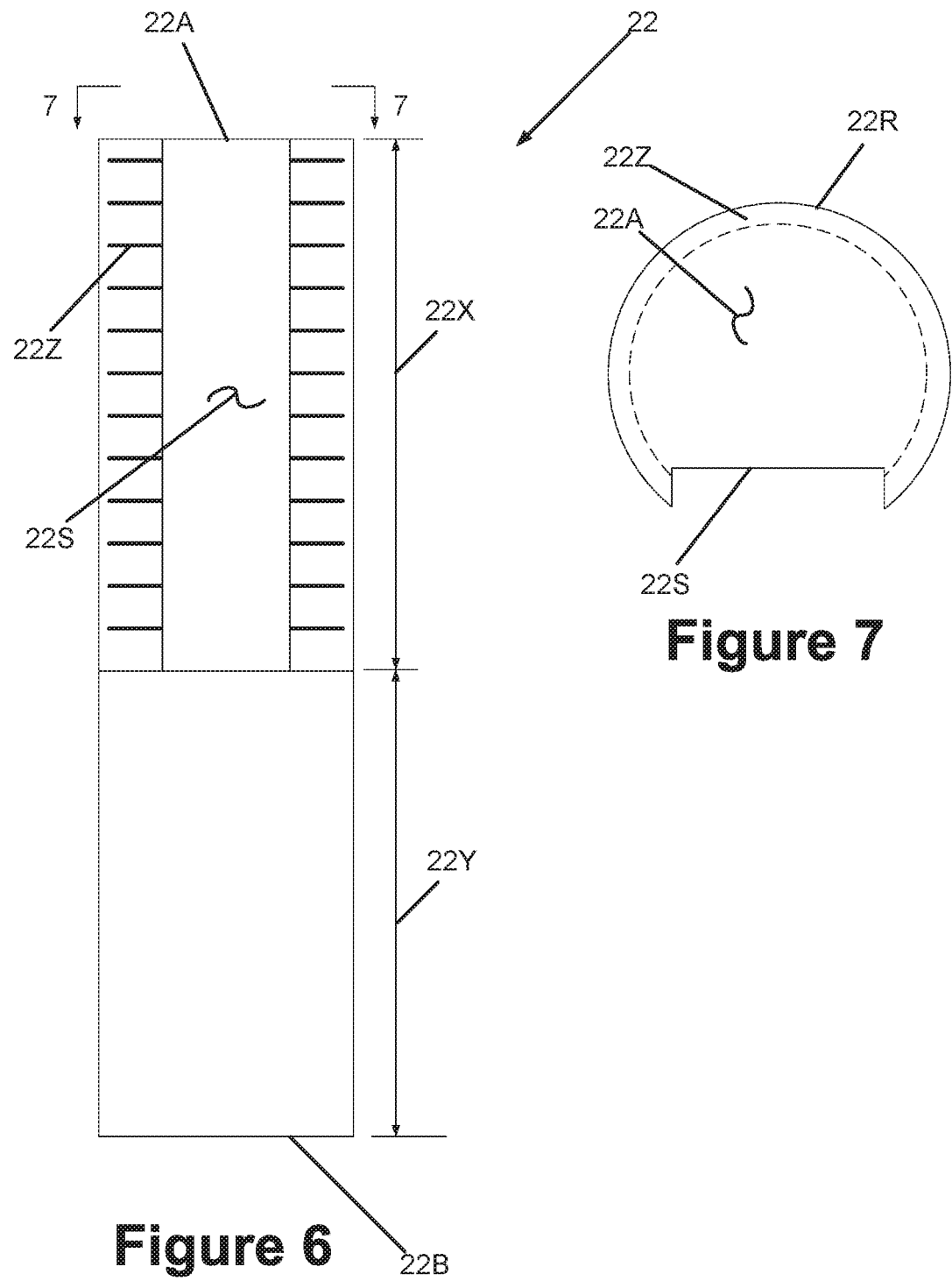

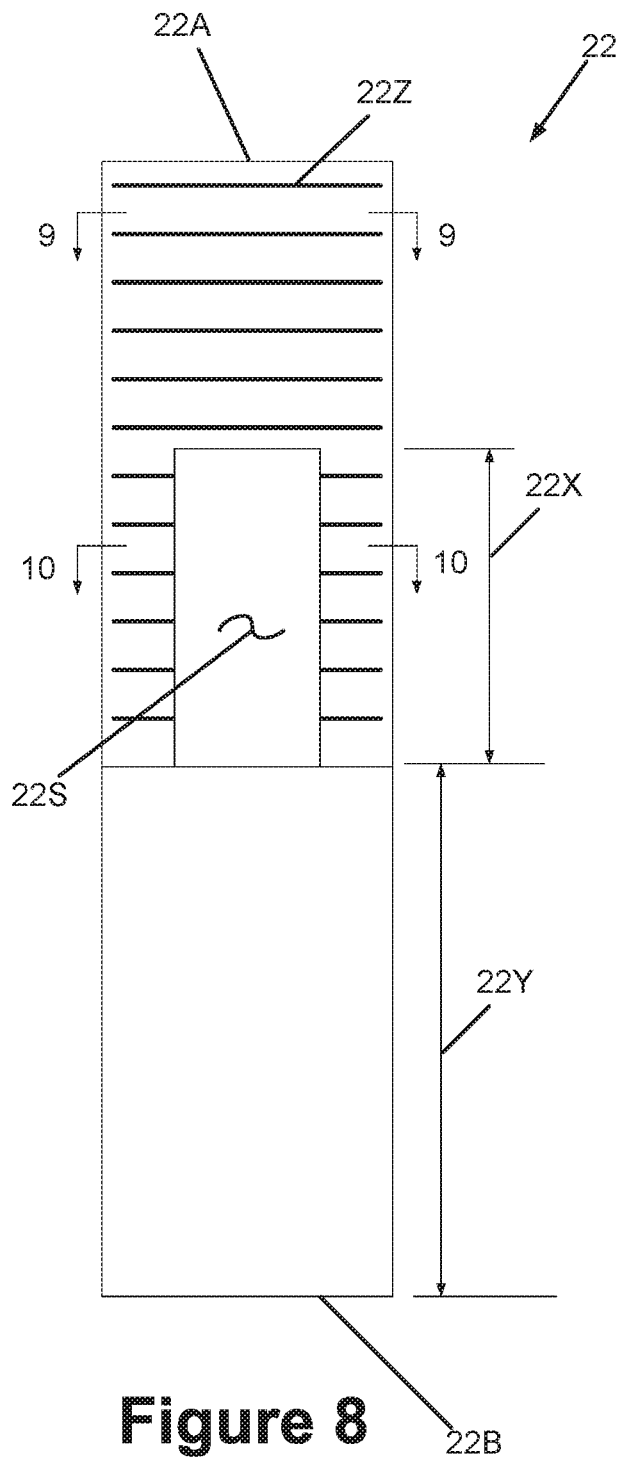
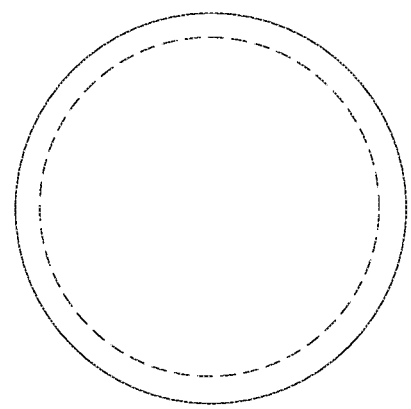
Figure 9
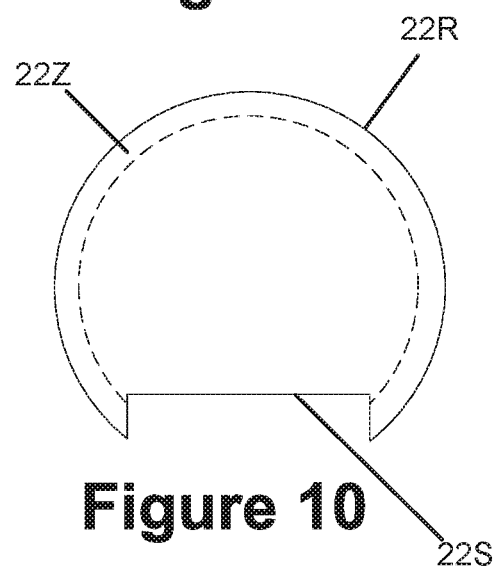
Figure 10
Figure 8

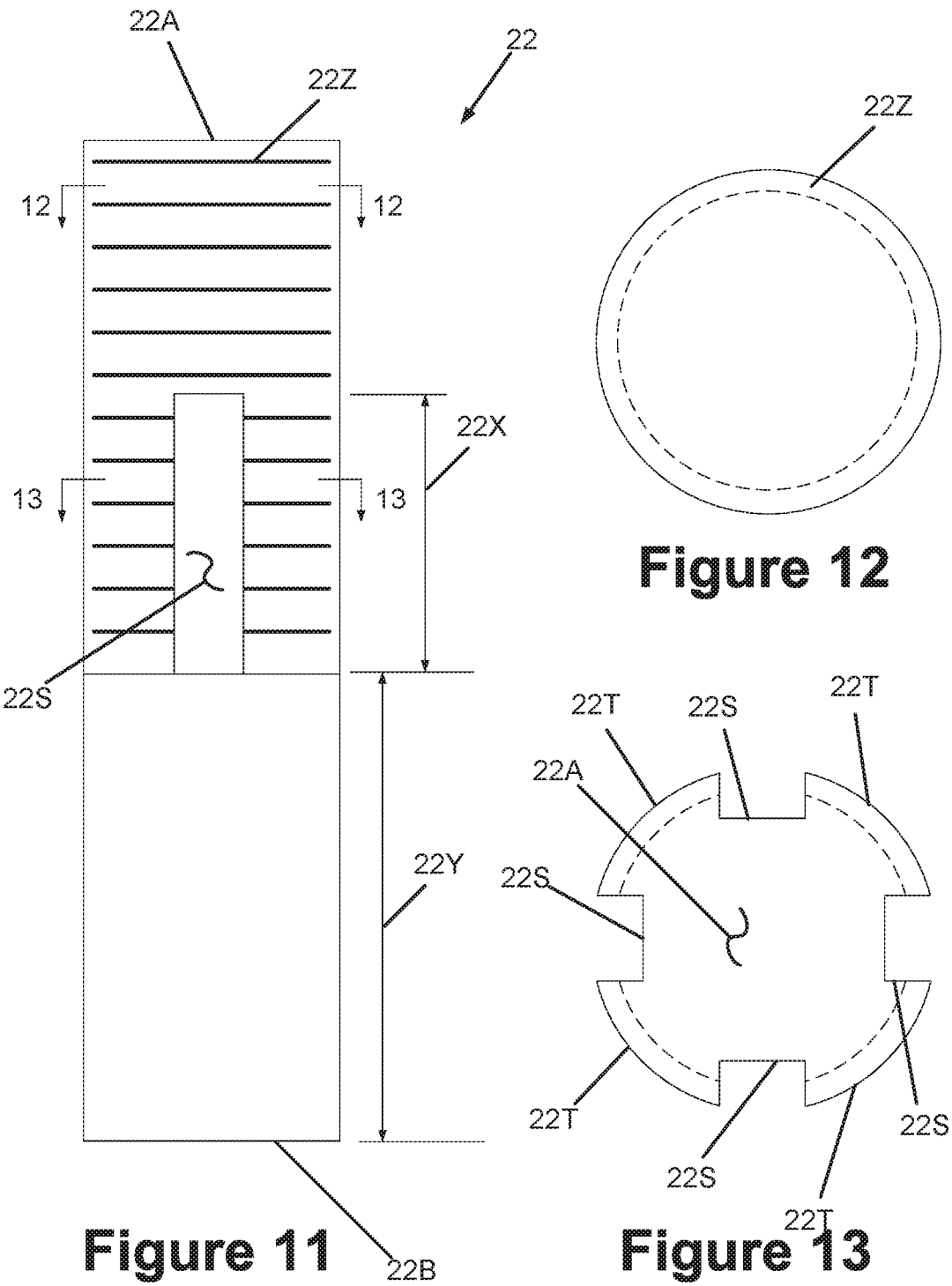

VALVE INCLUDING A VALVE STEM WITH A COMBINATION THREADED AND SPLINED SECTION

FIELD OF INVENTION

The present invention generally relates to valves that may be used in, for example, the oil and gas industry and, more particularly, to a unique valve that includes a valve stem with a combination threaded and splined section.

BACKGROUND OF THE INVENTION

Valves are commonly employed in many industries, such as, for example, the oil and gas industry, to control or regulate the flow of a fluid within a system, within a particular piece of equipment or between pieces of equipment, etc. There are a variety of different types of valves, e.g., gate valves, ball valves, choke valves, etc. In many valves, the operation of the valve involves moving a valve element positioned on the end of a valve stem into or across a flow path within the valve body to control the flow of fluid.

One illustrative example of a prior art choke valve 100 is depicted in FIGS. 1A-1C, wherein FIG. 1A is a cross-sectional view of the valve 100 with the valve stem 122 in a fully retracted position, FIG. 1B is a partial cross-sectional, perspective views of the valve stem 122 and FIG. 1C is an exploded perspective view of the valve stem 122.

As shown in these drawings, the prior art choke valve 100 is comprised of a valve body 112, a fluid inlet 114 and a fluid outlet 116. The valve 100 comprises an upper bonnet 118, a lower bonnet 119, a valve stem that is generally indicated with the reference number 122, a rotatable drive nut 124 and an internally splined anti-rotation ring 126. The valve stem 122 has a first end 122A and a second end 122B on opposite ends of the valve stem 122. The valve 100 also comprises a cage 128 and a valve element or plug 130 that is operatively coupled to the valve stem 122. Also depicted is a liner 131 that is positioned within the cage 128 such that the valve element 130 may seal against the liner 131. One or more openings (not shown) are provided in the choke cage 128 so as to provide a means of regulating the flow of fluid through the valve 100 by effectively closing (partially or fully) or opening (partially or fully) one or more of the openings in the cage 128 by translational movement of the valve element 130 into the flow path when the drive nut 124 is rotated.

In the depicted example, the upper bonnet 118 is secured to the body 112 by a plurality of threaded bolts 120, which, in turn, secures the lower bonnet 119 in a recess 112A in the valve body 112 and a recess 118A in the upper bonnet 118. The internally splined anti-rotation ring 126 is secured within a lower recess 123 by a plurality of threaded bolts 140. The valve 100 also comprises a lower bearing 133A and an upper bearing 133B. A lower portion of the drive nut 124 is positioned between the upper and lower bearings 133A-133B and they are secured within an upper recess 125 in the upper bonnet 118 by a cover plate 134 that is coupled to the upper bonnet 118 by a plurality of threaded bolts 136. An upper portion of the drive nut 124 extends through an opening 131 in the cover plate 134. Also depicted in FIG. 1A is a drive key 138 that is positioned in a recess 124R (see FIG. 1C) defined in the drive nut 124. The drive key 138 is provided to interface with an actuator that may be used to engage and rotate the drive nut 124.

FIGS. 1B and 1C provide additional details of the valve 100 and the valve stem 122 as well as the interworking relationship between various components of the valve 100.

As best shown in FIG. 1C, the prior art valve stem 122 comprises a separate threaded section 122X, a separate splined section 122Y and a separate unthreaded section 122Z that are spaced apart along the axial length of the valve stem 122. The externally threaded section 122X of the valve stem 122 is adapted to engage the internally threaded drive nut 124. The splined section 122Y of the stem 122 comprises a plurality of external splines 122YA that are adapted to engage the splines 126A on the internally splined anti-rotation ring 126. While the configuration of the valve 100 has proved useful, the use of the valve stem 122 that includes the axially spaced apart threaded portion 122X and splined portion 122Y means that the overall height of the valve 100, particularly the valve bonnet 118, must be of sufficient size to accommodate the axial length of the valve stem 122. However, making the bonnet 118 of sufficient size to accommodate the valve stem 122 also increases the overall size, weight and cost of the valve 100.

The present application is directed to a unique valve that includes a valve stem with a combination threaded and splined section that may eliminate or at least minimize some of the problems noted above.

BRIEF DESCRIPTION OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present application is generally directed to a unique valve that includes a valve stem with a combination threaded and splined section. In one example, the valve comprises, among other things, a body, a valve stem that comprises a combination threaded-splined section and an unthreaded section wherein the combination threaded-splined section comprises at least one spline and a thread. In this example, the valve also comprises an anti-rotation ring that includes at least one tab positioned in the at least one spline of the combination threaded-splined section and a threaded drive nut that is adapted to engage the thread of the combination threaded-splined section.

In another example, the valve disclosed herein includes, among other things, a body, a valve stem that includes a combination threaded-splined section and an unthreaded section wherein the combination threaded-splined section comprises a plurality of splines and a plurality of spaced-apart axial thread segments that are radially spaced around an outer perimeter of the combination threaded-splined section. In this example, the valve also comprises an anti-rotation ring that includes a plurality of tabs, wherein each of the tabs is positioned in one of the plurality of splines of the combination threaded-splined section and a threaded drive nut that is adapted to engage the plurality of spaced-apart axial thread segments of the combination threaded-splined section.

In yet another example, the valve disclosed herein includes, among other things, a body, a valve stem that includes a combination threaded-splined section and an unthreaded section, wherein the combination threaded-spline section includes a single spline that defines a partial ring thread segment that extends partially around an outer perimeter of the combination threaded-splined section. In this example, the valve also comprises an anti-rotation ring that includes a single tab that is positioned in the single spline of the combination threaded-splined section and a threaded drive nut that is adapted to engage the partial ring thread segment of the combination threaded-splined section.

BRIEF DESCRIPTION OF THE DRAWINGS

The present invention will be described with the accompanying drawings, which represent a schematic but not limiting its scope:

FIGS. 2A-2C are cross-sectional views of one illustrative embodiment of a novel valve disclosed herein with a novel threaded and splined valve stem section, wherein FIG. 2A, depicts the valve stem in a fully retracted position, FIG. 2B depicts the valve stem in a partially extended position and FIG. 2C depicts the valve stem in a fully extended position;

FIGS. 3A-3C are partial cross-sectional, perspective views of one illustrative embodiment of a novel valve disclosed herein with a valve stem having a novel threaded and splined section, wherein FIG. 3A, depicts the valve stem in a fully retracted position, FIG. 3B depicts the valve stem in a partially extended position and FIG. 3C depicts the valve stem in a fully extended position;

FIGS. 4A-4C are other partial cross-sectional, perspective views of one illustrative embodiment of a novel valve disclosed herein novel with a valve stem that includes a threaded and splined section, wherein FIG. 4A, depicts the valve stem in a fully retracted position, FIG. 4B depicts the valve stem in a partially extended position and FIG. 4C depicts the valve stem in a fully extended position;

FIGS. 6-7 are side views of an illustrative embodiment of the valve stem disclosed herein;

FIGS. 8-10 are side views of yet other illustrative embodiments of the valve stem disclosed herein; and FIGS. 11-13 are side views of even further illustrative embodiments of the valve stem disclosed herein.

Figure 1A:
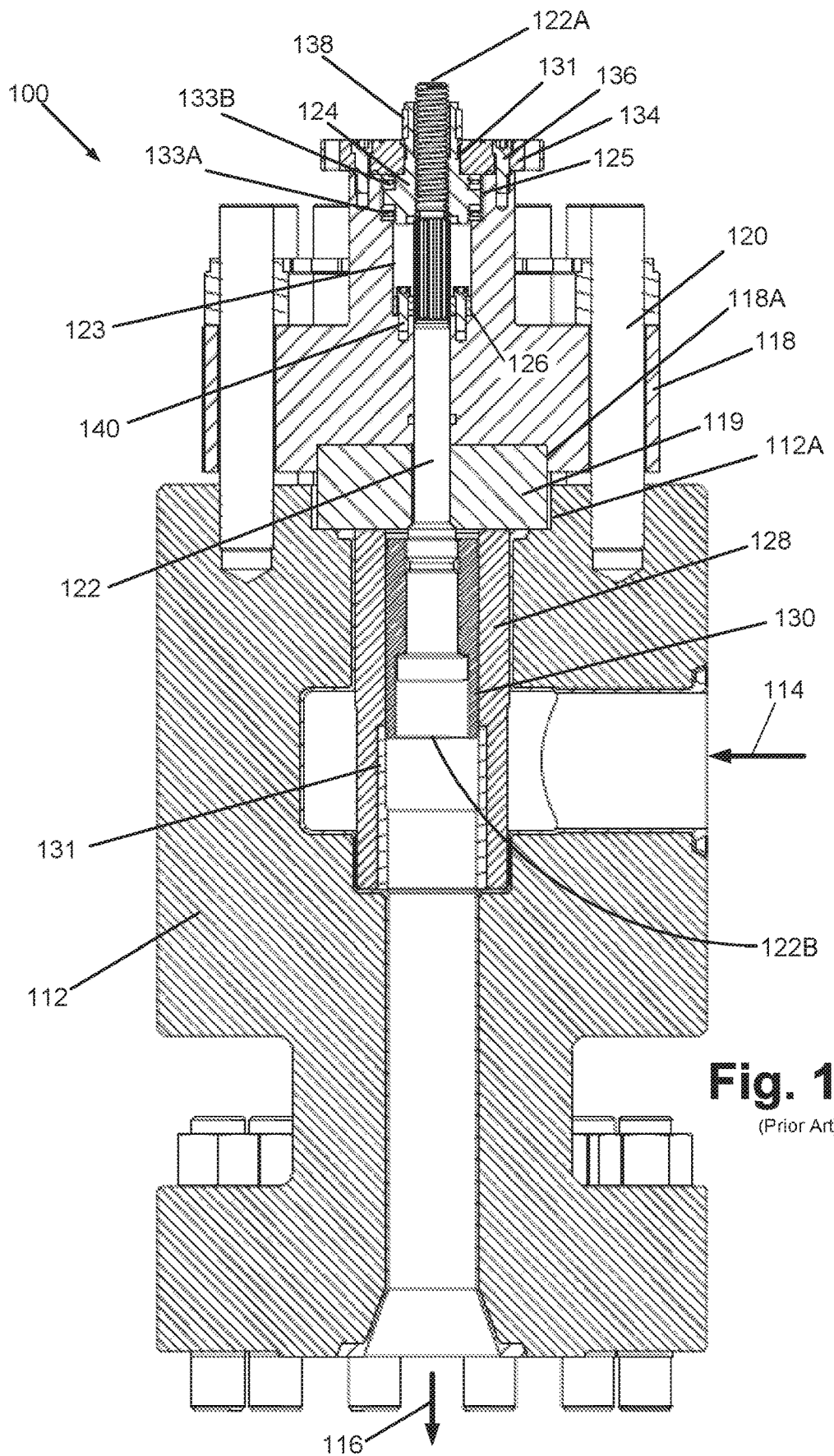
FIGS. 1A-1C are various views of an illustrative prior art choke valve.
Figure 1B:
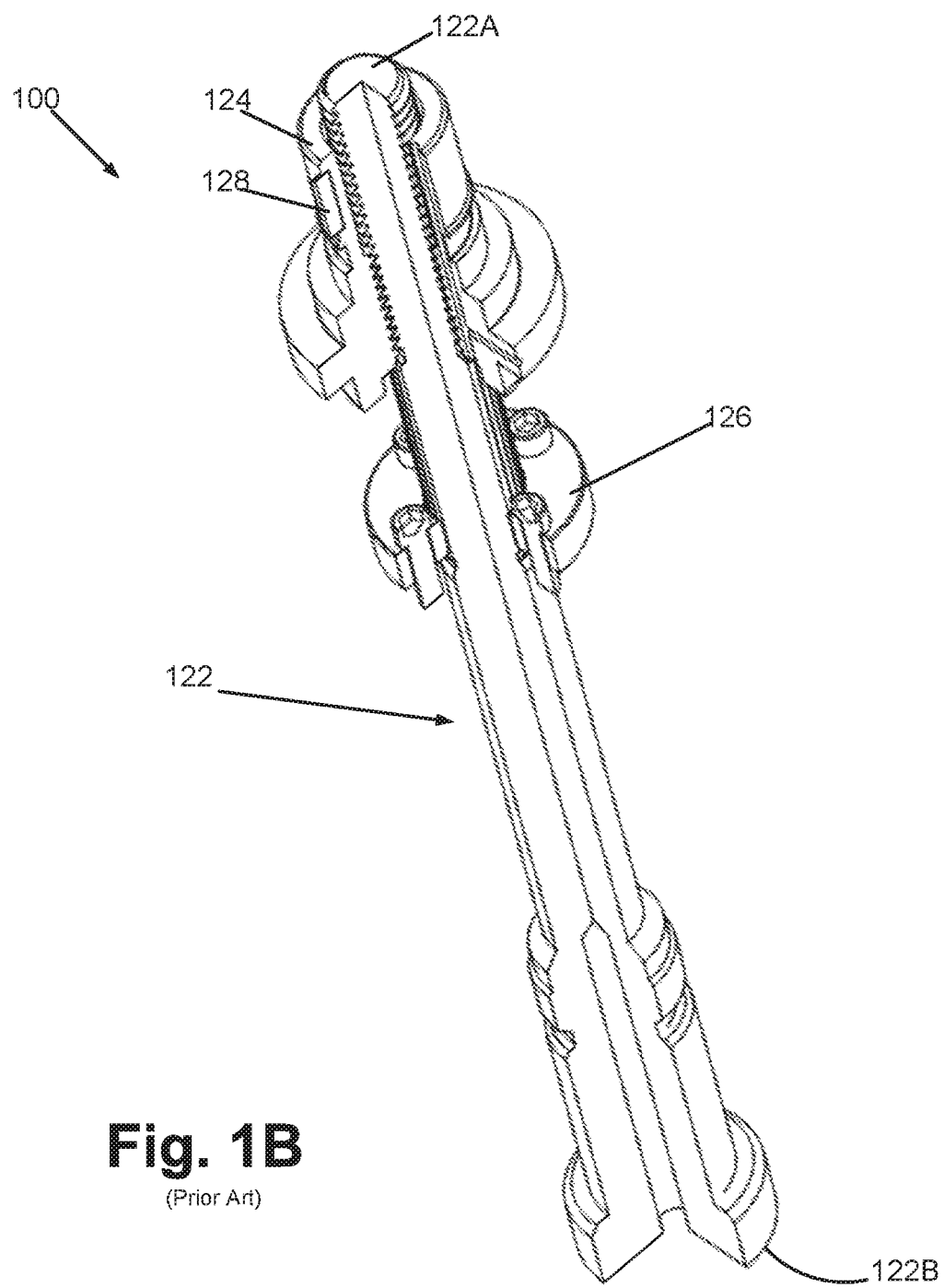
Figure 1C:
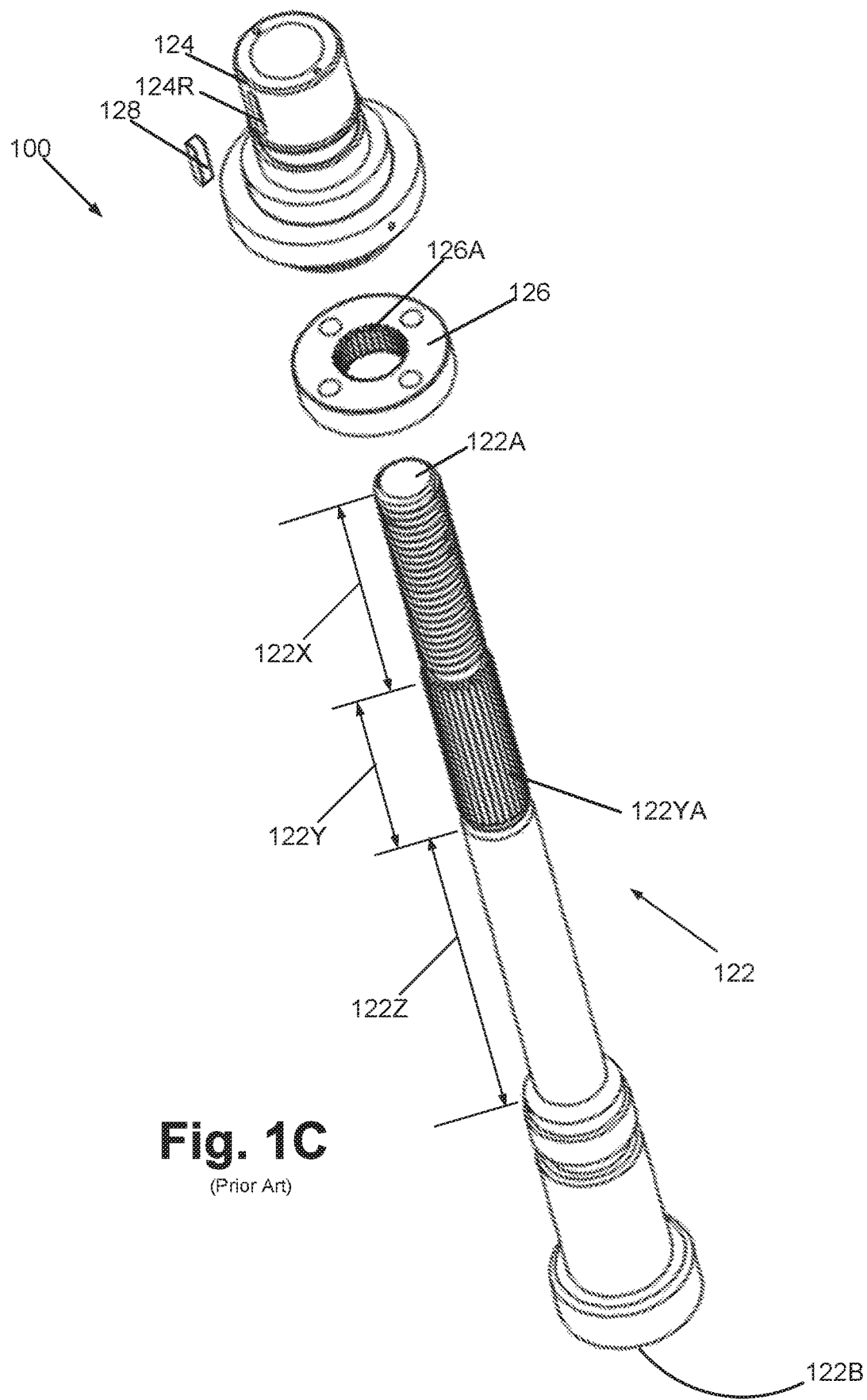

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with valve-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, valves and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and custom-ary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2A:
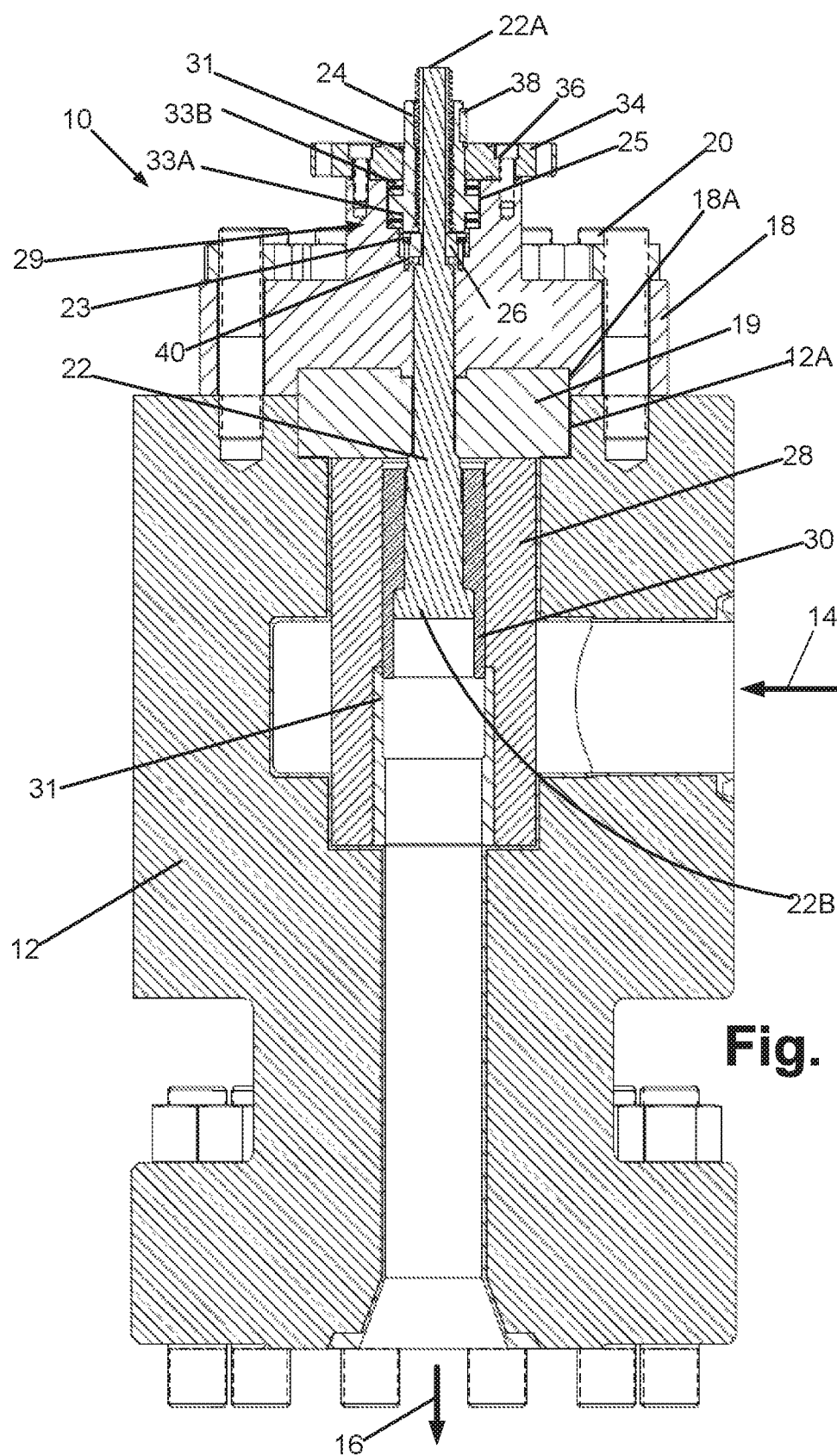
Figure 2B:
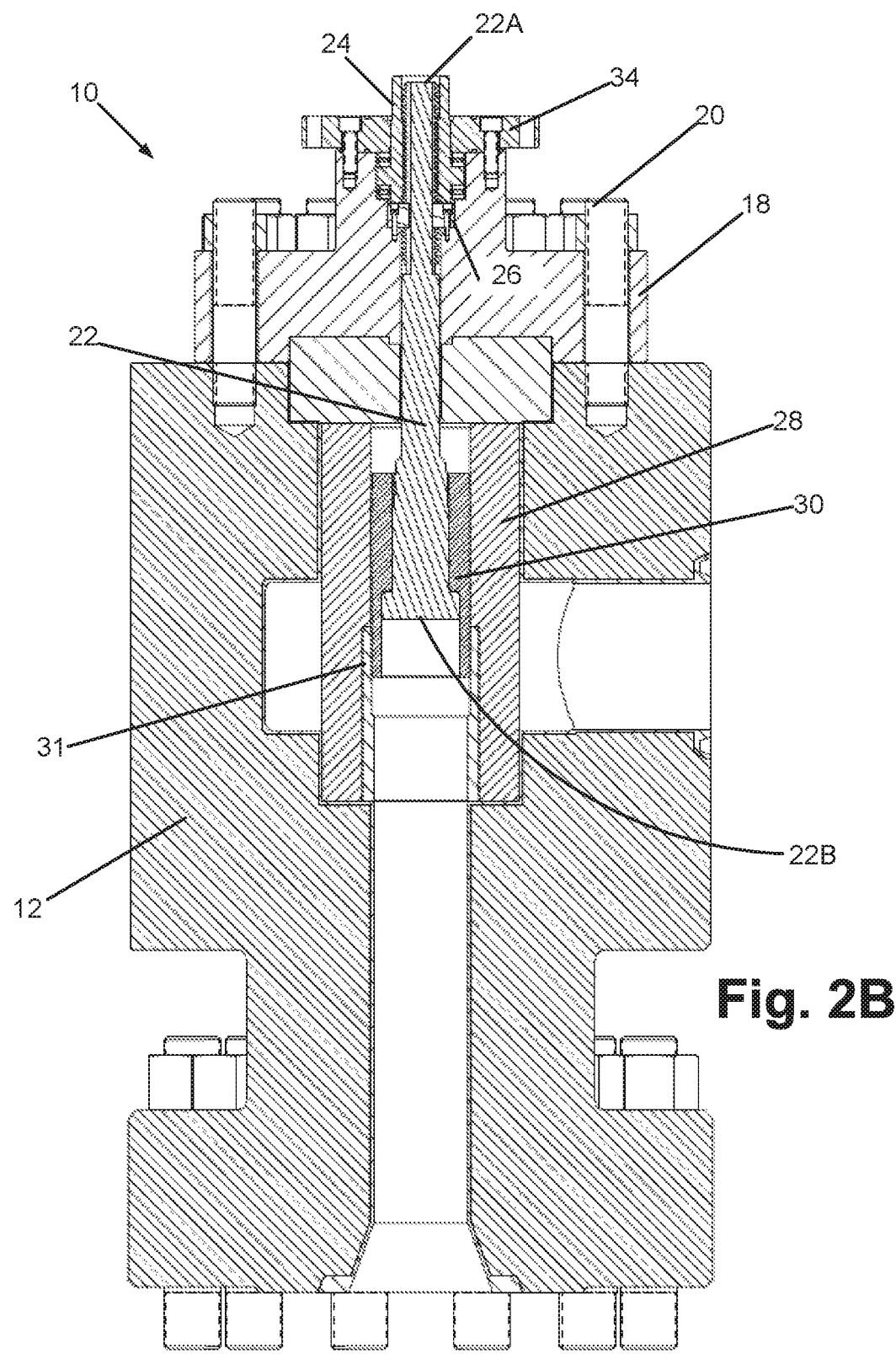
Figure 2C:
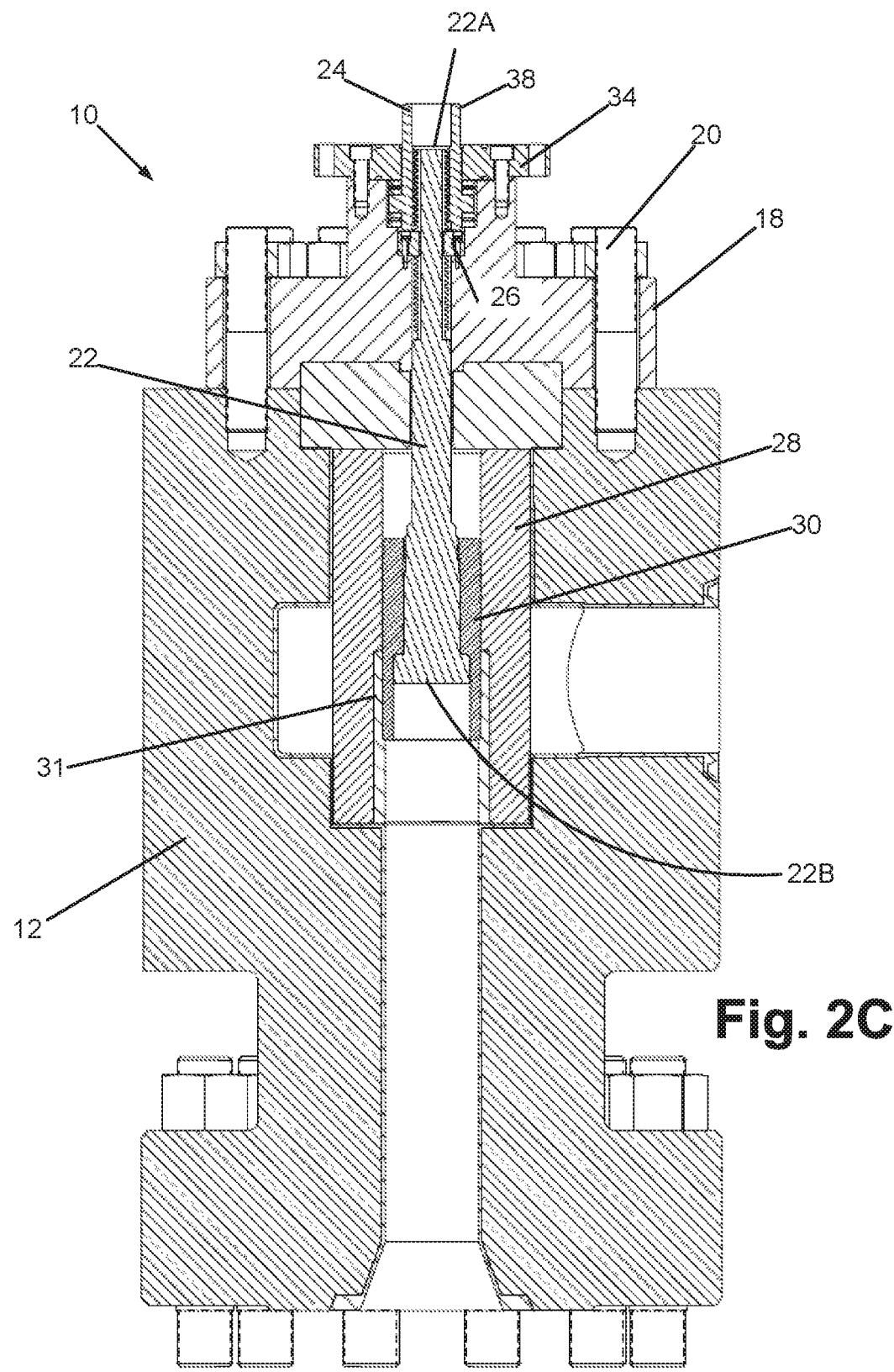
Figure 3A:
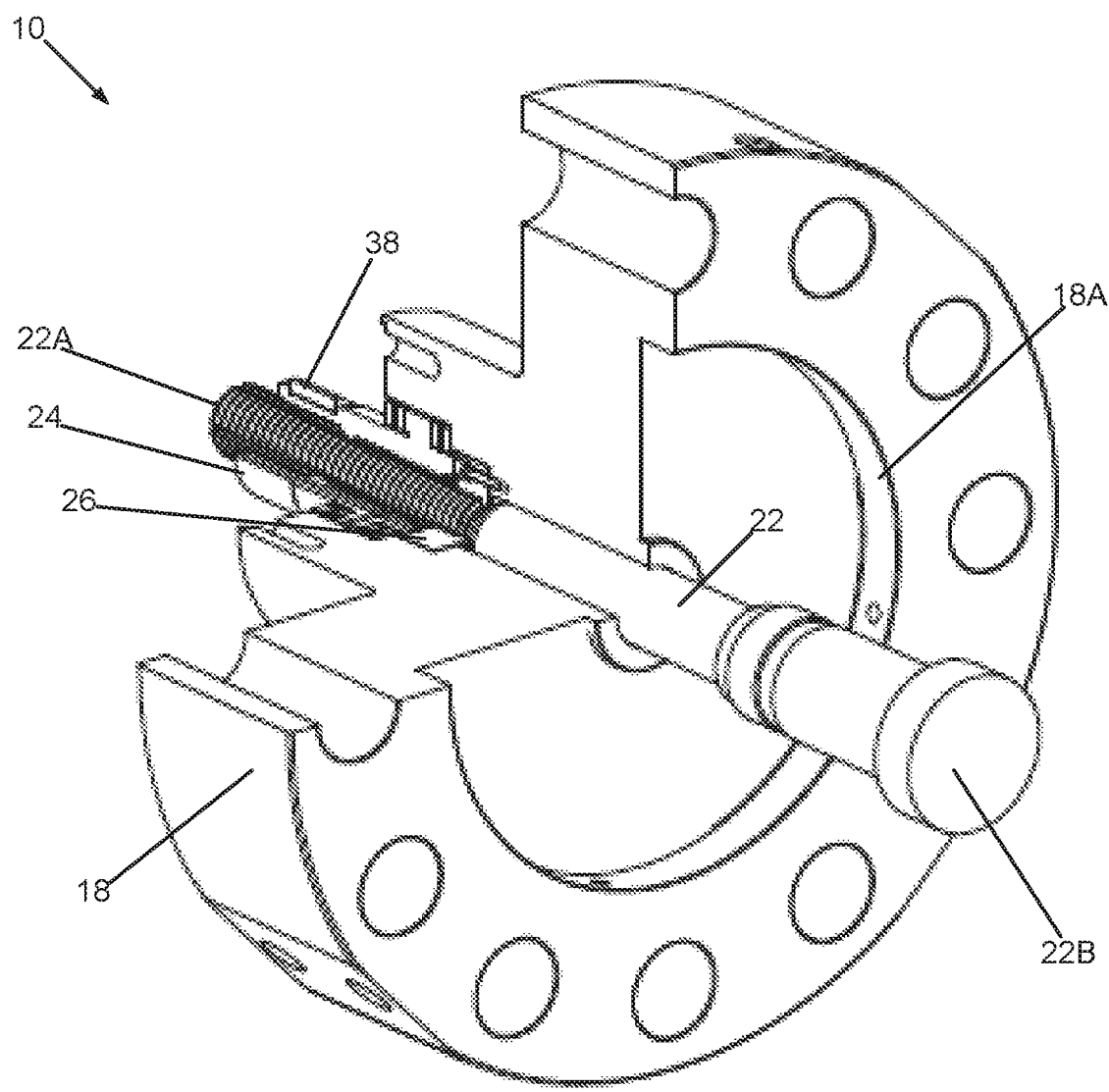
Figure 3B:
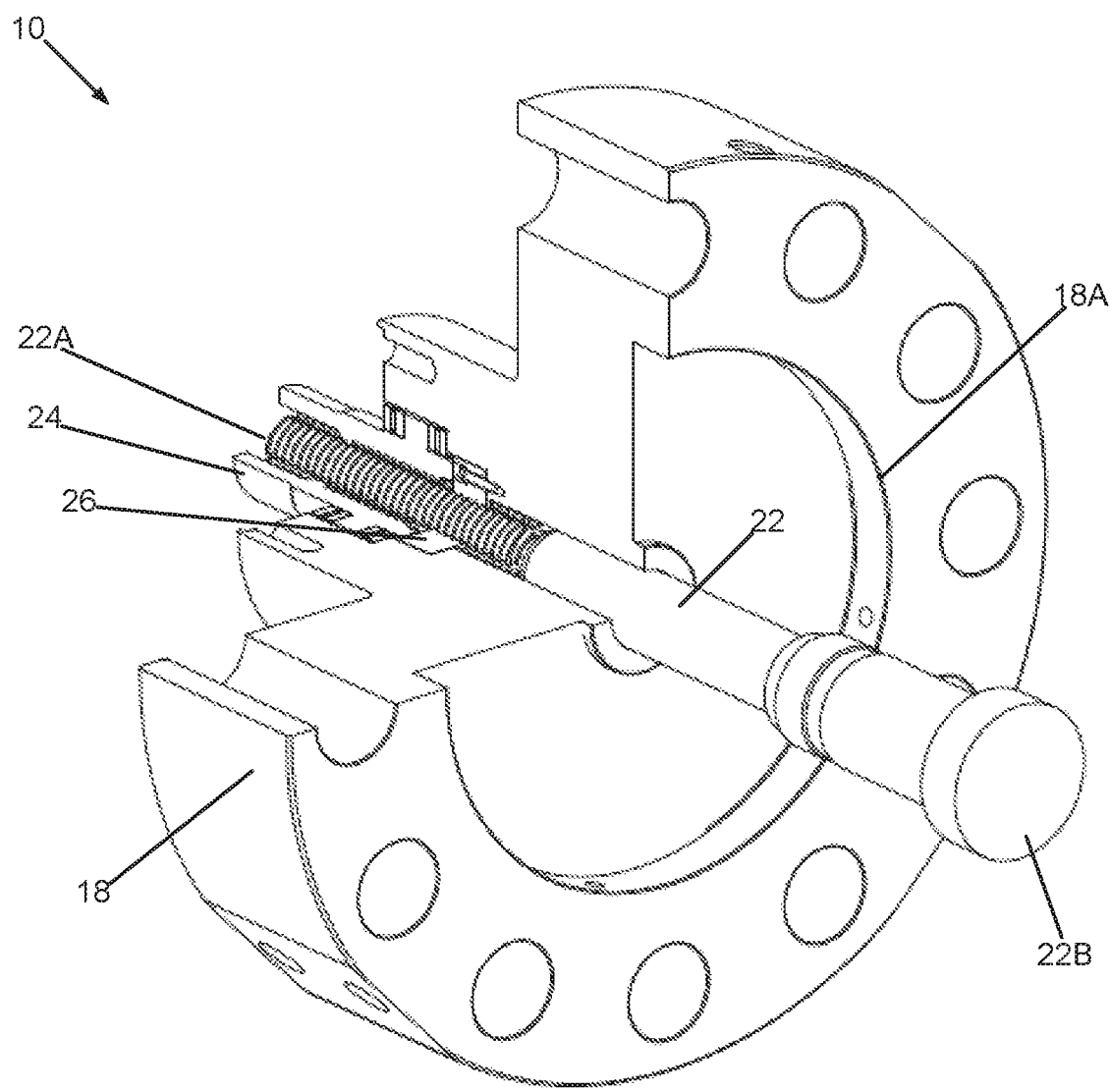
Figure 3C:
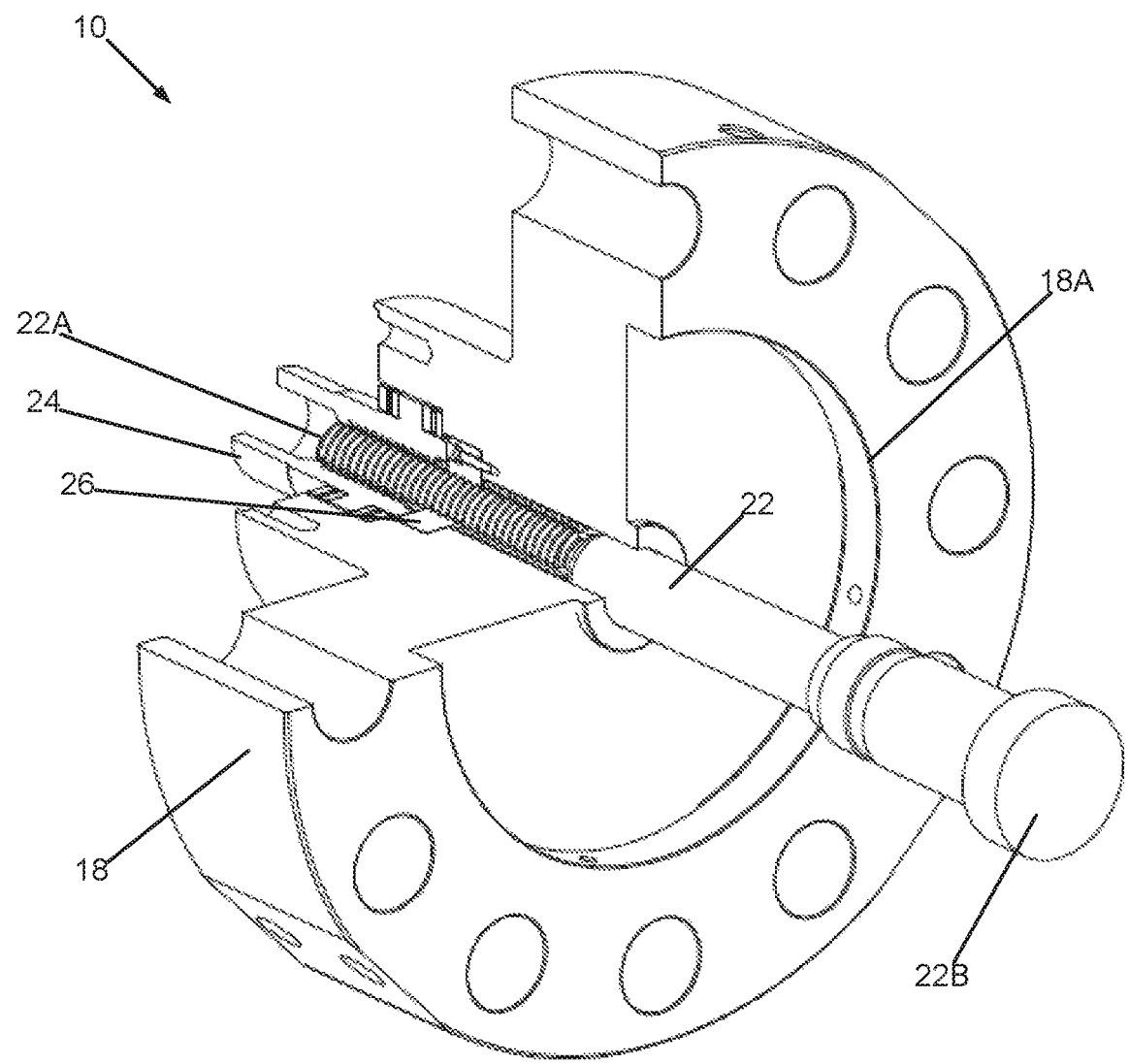
Figure 4A:
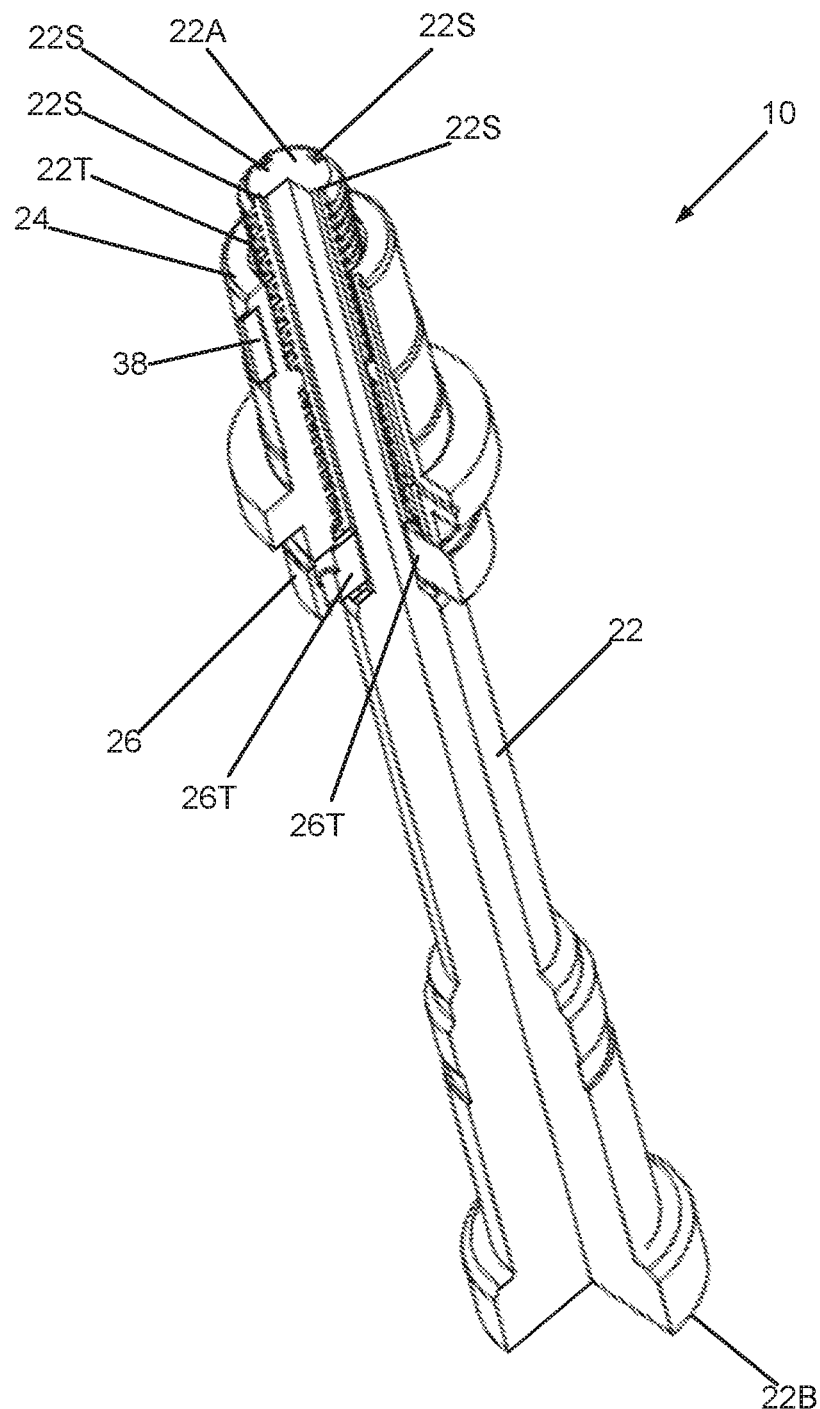
Figure 4B:
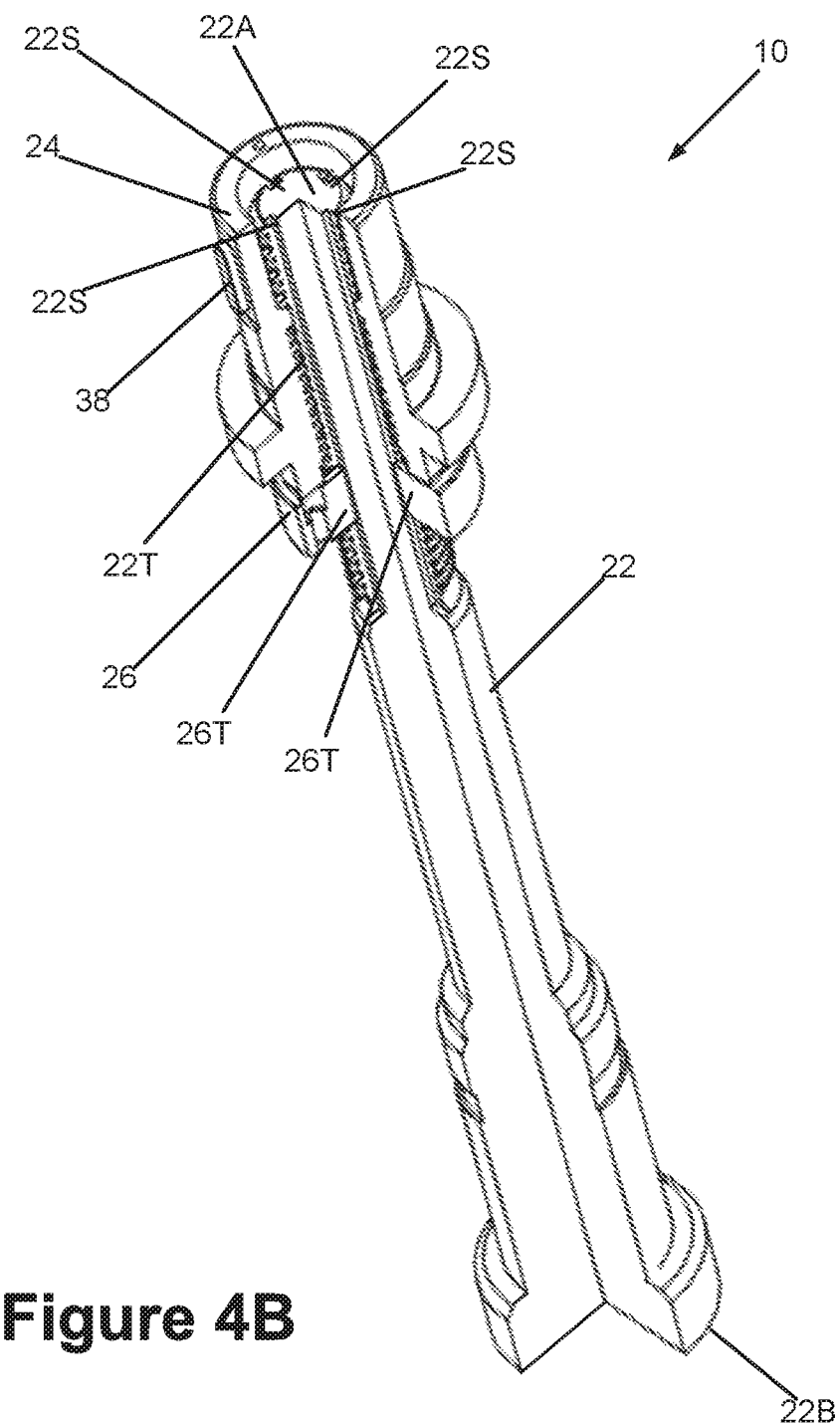
Figure 4C:
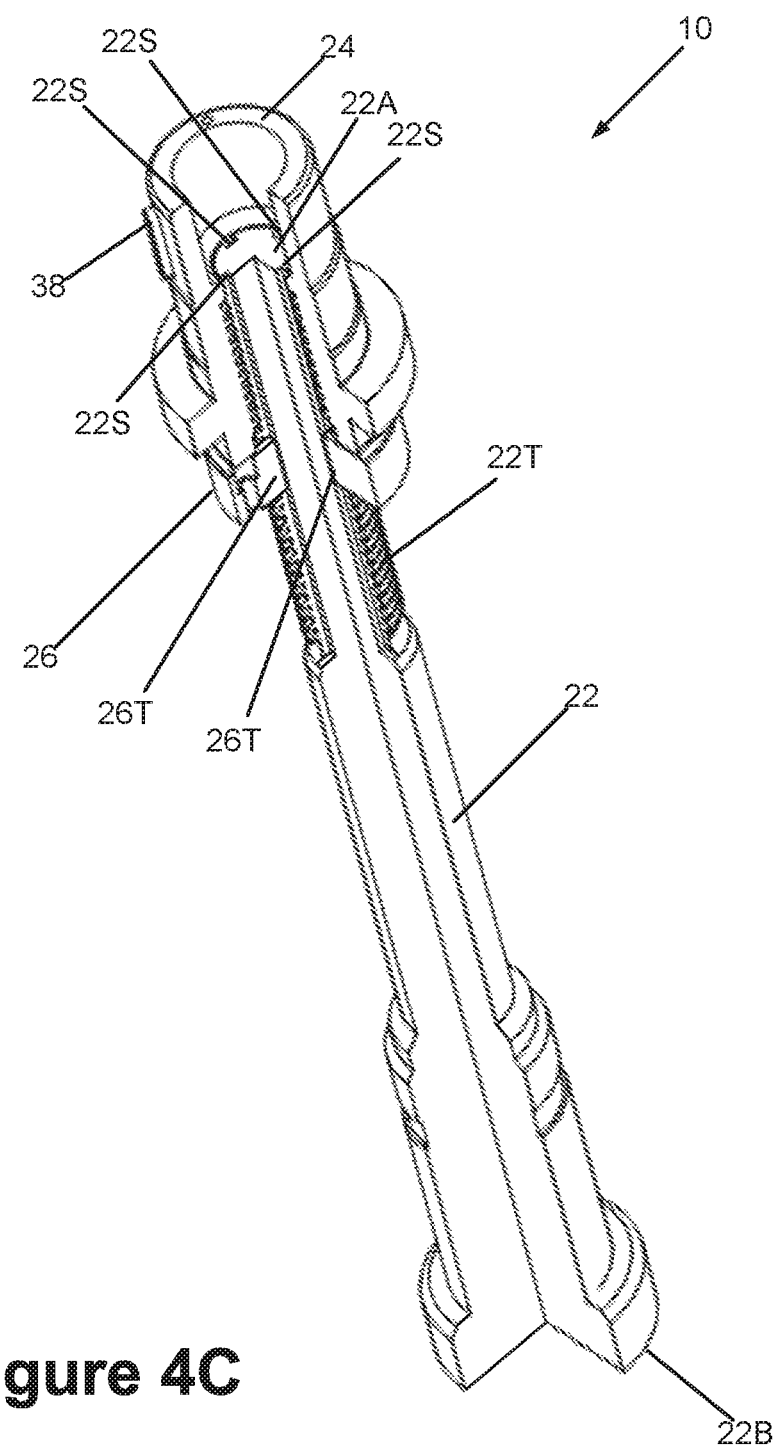
Figure 5:
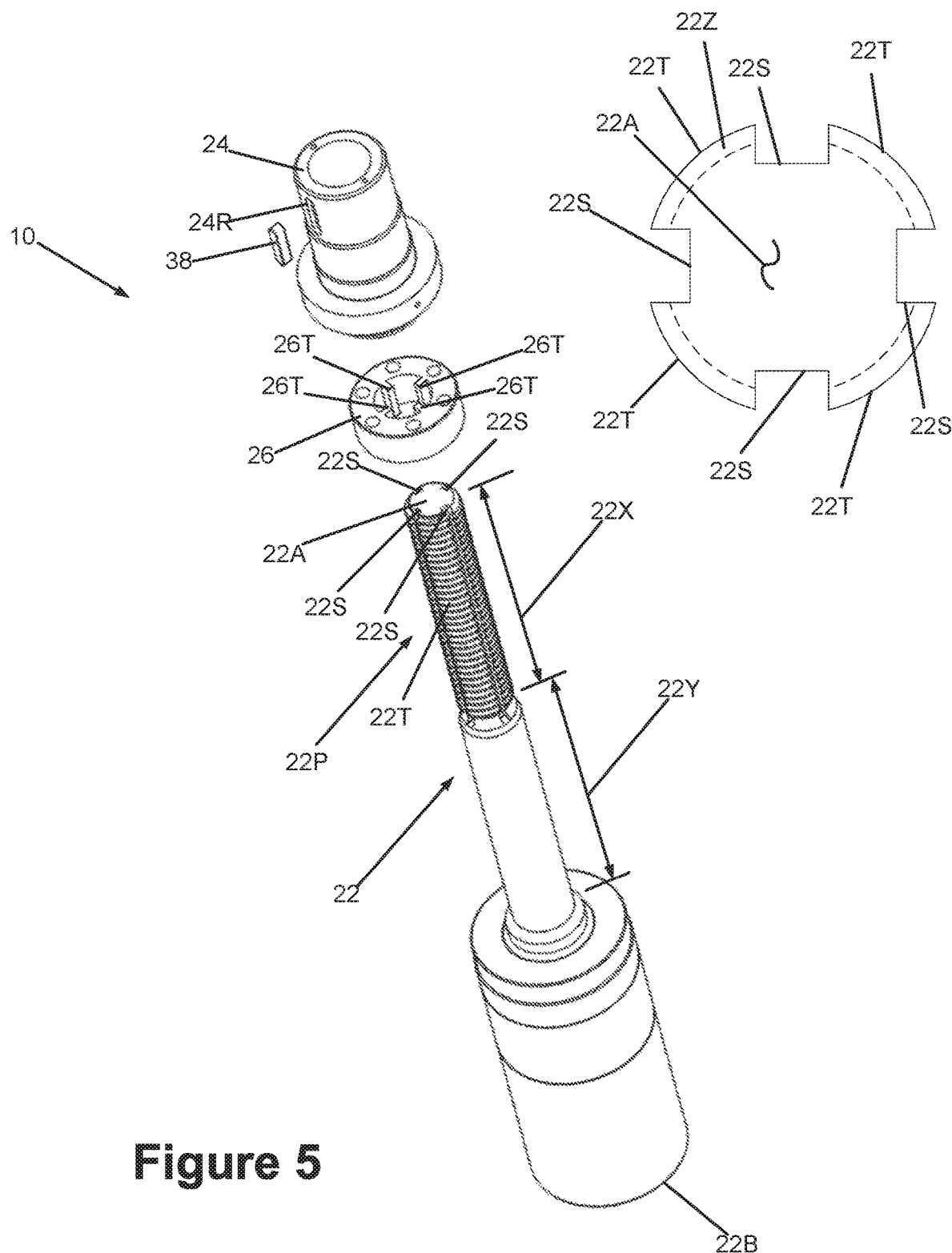
FIG. 5 is an exploded perspective view of one illustrative embodiment of a novel valve stem with a threaded and splined section disclosed herein.

One illustrative example of a novel valve 10 that includes a novel valve stem 22 disclosed herein with a combination threaded and splined section will be described with reference to the attached drawings. FIGS. 2A-2C are cross-sectional views of one illustrative embodiment of a valve 10 disclosed herein with a novel valve stem 22 that includes a combination threaded and splined section, wherein FIG. 2A, depicts the valve stem 22 in a fully retracted position, FIG. 2B depicts the valve stem 22 in a partially extended position and FIG. 2C depicts the valve stem 22 in a fully extended position. FIGS. 3A-3C are partial cross-sectional, perspective views of one illustrative embodiment of a novel valve stem 22 disclosed herein, wherein FIG. 3A, depicts the valve stem 22 in a fully retracted position, FIG. 3B depicts the valve stem 22 in a partially extended position and FIG. 3C depicts the valve stem 22 in a fully extended position. FIGS. 4A-4C are yet other partial cross-sectional, perspective views of one illustrative embodiment of a novel threaded and splined valve stem 22 disclosed herein, wherein FIG. 4A, depicts the valve stem 22 in a fully retracted position, FIG. 4B depicts the valve stem 22 in a partially extended position and FIG. 4C depicts the valve stem 22 in a fully extended position. FIG. 5 is an exploded perspective view of one illustrative embodiment of a novel valve stem 22 with a combination threaded and splined section disclosed herein. Of course, the presently disclosed inventions should not be considered to be limited to the illustrative embodiments depicted in the attached drawings.

As shown in these drawings, the valve 10 is comprised of a valve body 12, a fluid inlet 14 and a fluid outlet 16. In the example depicted herein, the valve 10 takes the form of a choke valve. However, as will be appreciated by those skilled in the art after a complete reading of the present application, the valve 10 disclosed herein may be used on any of a variety of different types of valves that involve translational movement of a valve element or plug 30 that is operatively coupled to the valve stem 22, such as a gate valve, a needle valve, etc.

With continuing reference to FIG. 2A, the valve 10 comprises an upper bonnet 18, a lower bonnet 19, a rotatable drive nut 24, an anti-rotation ring 26 and a valve stem that is generally indicated with the reference number 22. The valve stem 22 has a first end 22A and a second end 22B on opposite ends of the valve stem 22. The valve 10 also comprises a cage 28 and a valve element 30 that is operatively coupled to the valve stem 22. Also depicted is a liner 31 that is positioned within the cage 28 such that the valve element 30 may seal against the liner 31. One or more openings (not shown) are provided in the choke cage 28 so as to provide a means of regulating the flow of fluid through the valve 10 by effectively closing (partially or fully) or opening (partially or fully) one or more of the openings in the cage 28 by translational movement of the valve element 30 into the flow path when the valve stem 22 is rotated.

In the depicted example, the upper bonnet 18 is secured to the body 12 by a plurality of threaded fasteners 20, e.g., threaded bolts 20, which, in turn, secures the lower bonnet 19 in a recess 12A in the valve body 12 and a recess 18A in the upper bonnet 18. In the example shown herein, the valve includes a stepped recess 29 defined in the upper bonnet 18. The stepped recess 29 includes a lower recess 23 and an upper recess 25 positioned above the lower recess 23, wherein the lower recess 23 and the upper recess 25 are open to one another. In the depicted example, the diameter or size of the upper recess 25 is greater than the diameter or size of the lower recess 23. The anti-rotation ring 26 is secured within the lower recess 23 by a plurality of threaded fasteners 40, e.g., threaded bolts 40. The valve 10 also comprises a lower bearing 33A and an upper bearing 33B. A lower portion of the drive nut 24 is positioned between the upper and lower bearings 33A-33B. The valve 10 further comprises a cover plate 34 having an opening 31 defined therein. An upper portion of the drive nut 24 extends through the opening 31 in the cover plate 34. The lower portion of the drive nut 24 and the bearings 33A-33B, are secured within the upper recess 25 by the cover plate 34 that is coupled to the upper bonnet 18 by a plurality of threaded fasteners 36, e.g., threaded bolts 36. Also depicted in FIG. 2A is a drive key 38 that is positioned in a recess 24R (see FIG. 5) defined in the drive nut 24. The drive key 38 is provided to interface with an actuator (not shown) that may be used to engage and rotate the drive nut 24. Such an actuator may be in the form of a hydraulically driven actuator, an electrically driven actuator, or the actuator may be in the form of a manual override actuator that is driven by a tool or an ROV.

FIGS. 4A-4C and 5 provide additional details of the valve 10 and the valve stem 22 as well as the interworking relationship between various components of the valve 10. As best shown in FIG. 5, the illustrative valve stem 22 depicted herein comprises a combination threaded-splined section 22X and an unthreaded section 22Y. In one illustrative embodiment, the combination threaded-splined section 22X of the stem 22 comprises a thread 22Z and a plurality of splines 22S that are cut into the thread 22Z to define a plurality of spaced-apart axial thread segments 26T. In the example depicted in FIG. 5, the combination threaded-splined section 22X comprises four illustrative splines 22S that extend axially along the stem 22 for the entire axial length of the thread 22Z that effectively cuts the thread 22Z into four equal spaced-apart axial thread segments 22T that are radially spaced around the perimeter 22P of the combination threaded-splined section 22X. In the example depicted herein, the spaced-apart axial thread segments 22T extend axially along the outer perimeter 22P in a direction that is substantially parallel to a central (long) axis of the valve stem 22. Of course, as will be appreciated by those skilled in the art after a complete reading of the present application, the valve stem 22 may be provided with any desired number, e.g., 2, 3, 4, etc. of the splines 22S and the spaced-apart axial thread segments 22T. The size, shape and configuration of the splines 22S and the spaced-apart axial thread segments 22T may vary depending upon the particular application.

With continuing reference to FIG. 5, the anti-rotation ring 26 comprises a plurality of tabs or tongues 26T, each of which is adapted to be positioned within a corresponding spline 22S of the stem 22 so as to prevent rotational movement of the stem 22 within the anti-rotation ring 26 while still allowing translational movement of the stem 26 through the anti-rotation ring 26 when the drive nut 24 is rotated.

FIGS. 6 and 7 depict an embodiment of the valve stem 22 wherein only a single spline 22S is cut into the thread 22Z on the threaded portion of the combination threaded-splined section 22X of the stem 22. In this example, the thread 22Z on the stem 22 is effectively cut into a partial ring segment 22R that extends for the entire axial length of the combination threaded-splined section 22X portion of the stem 22.

FIGS. 8-13 depict embodiments of the valve stem 22 wherein the combination threaded-splined section 22X of the valve stem 22 extends for the less than the entire axial length of the threaded portion of the valve stem 22. As shown in FIG. 8-10, the valve stem 22 may be provided with a single spline 22S that forms the thread 22Z into a partial ring segment 22R that extends for the less than the entire axial length of the threaded portion of the stem 22. As shown in FIG. 11-13, the valve stem 22 may be provided with four illustrative splines 22S that extend axially along the stem 22 for less than the entire axial length of the thread 22Z so as to define four equal spaced-apart axial thread segments 22T that are radially spaced around the perimeter 22P of the threaded-splined section 22X. In this latter situation, the axial length of the threaded-splined section 22X need only be long enough to account for the thickness of the anti-rotation nut 26 plus the desired travel or stroke of the stem 22 (from a fully retracted position to a fully extended position) plus some additional length for tolerances, etc.

In the examples depicted herein, the valve stem 22 comprises an external thread 22Z and the drive nut 24 comprises a corresponding and mating internal thread, although that configuration may not be required in all applications. The thread 22Z formed on the stem 22 and the drive nut 24 may be any type of thread, e.g., a standard ACME thread, and the number, size and position of the splines 22S may vary depending upon the particular application. In one illustrative embodiment, the splines 22S may be essentially squared-bottom grooves that are cut into the thread 22Z, and the splines 22S may have a depth that is deeper than the thread 22Z. The axial length of the combination threaded-splined section 22X may also vary depending upon the particular application, the size of the valve 10 and/or the desired stroke length of the valve element 30 during operation. Similarly, the axial length of the unthreaded section 22Y may vary depending upon the particular application.

As indicated above, FIGS. 2A, 3A and 4A depict the valve 10 with the valve stem 22 and the valve element 30 is the fully retracted position, i.e., where the valve 10 is fully open. FIGS. 2B, 3B and 4B depict the valve 10 with the valve stem 22 and the valve element 30 is in an intermediate position, i.e., where the valve 10 is partially closed and fluid flow through the valve is partially choked. FIGS. 2C, 3C and 4C depict the valve 10 in the position wherein the valve element 30 is in a fully seated position, i.e., where the flow of fluid through the valve 10 is fully obstructed or shut off. As will be appreciated by those skilled in the art after a complete reading of the present application, the novel valve stem 22 with the combination threaded-splined section 22X provides a means by which the valve 10 may be made more compact and, as a result, have a reduced weight as compared to prior art designs.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:

1. A valve, comprising:
    a body;
    a valve stem comprising a combination threaded-splined section and an unthreaded section, the combination threaded-splined section comprising at least one spline and a thread;
    an anti-rotation ring comprising at least one tab positioned in the at least one spline of the combination threaded-splined section; and
    a threaded drive nut that is adapted to engage the thread of the combination threaded-splined section, wherein at least a portion of the thread comprising the combination threaded-splined section is adapted to translationally move through a first end of the anti-rotation ring and exit out a second end of the anti-rotation ring when the threaded drive nut is rotationally actuated to translationally move the valve stem within the valve.

2. The valve of claim 1, wherein the valve further comprises at least one additional spline, the at least one spline and the at least one additional spline defining a plurality of spaced-apart axial thread segments that are radially spaced around an outer perimeter of the combination threaded-splined section.

3. The valve of claim 2, wherein the combination threaded-splined section extends for an entire axial length of a threaded portion of the valve stem.

4. The valve of claim 1, wherein the at least one spline comprises a single spline that defines a partial ring thread segment that extends partially around an outer perimeter of the combination threaded-splined section.

5. The valve of claim 4, wherein the combination threaded-splined section extends for an entire axial length of a threaded portion of the valve stem.

6. The valve of claim 1, wherein the combination threaded-splined section extends for an entire axial length of a threaded portion of the valve stem.

7. The valve of claim 1, wherein the combination threaded-splined section extends for less than an entire axial length of a threaded portion of the valve stem.

8. The valve of claim 1, wherein the combination threaded-splined section comprises four splines that define four spaced-apart axial thread segments that are radially spaced around an outer perimeter of the combination threaded-splined section and extend for an entire axial length of a threaded portion of the valve stem.

9. The valve of claim 1, wherein the anti-rotation ring is positioned within a recess defined in a bonnet that is coupled to the valve body.

10. The valve of claim 9, wherein the recess is a first recess, a portion of the drive nut being positioned in a second recess defined in the bonnet, wherein the second recess is positioned above the first recess.

11. The valve of claim 1, further comprising:
    a bonnet that is coupled to the valve body by a plurality of threaded fasteners; and
    a stepped recess defined in the bonnet, the stepped recess comprising a lower recess and an upper recess positioned above the lower recess, the upper recess having a larger diameter than a diameter of the lower recess, wherein the anti-rotation ring is positioned within the lower recess and at least a portion of the drive nut is positioned in the upper recess.

12. The valve of claim 11, further comprising:
    a plurality of threaded fasteners that couple the anti-rotation ring to the bonnet;
    a cover plate positioned above the upper recess, wherein a portion of the drive nut extends through an opening in the cover plate; and
    a plurality of threaded fasteners that couple the cover plate to the bonnet.

13. The valve of claim 1, wherein the combination threaded-splined section has a central axis and comprises a plurality of spines, and wherein the plurality of splines are equally spaced around an outer perimeter of the combination threaded-splined section and extend axially in a direction that is substantially parallel to the central axis.

14. The valve of claim 1, wherein the thread is an external thread.

15. A valve, comprising:
    a body;
    a valve stem comprising a combination threaded-splined section and an unthreaded section, the combination threaded-spline section comprising a plurality of splines and a plurality of spaced-apart axial thread segments that are radially spaced around an outer perimeter of the combination threaded-splined section;
    an anti-rotation ring comprising a plurality of tabs, each of the plurality of tabs being positioned in one of the plurality of splines of the combination threaded-splined section; and
    a threaded drive nut that is adapted to engage the plurality of spaced-apart axial thread segments of the combination threaded-splined section, wherein at least a portion of the plurality of spaced-apart axial thread segments comprising the combination threaded-splined section is adapted to translationally move through a first end of the anti-rotation ring and exit out a second end of the anti-rotation ring when the threaded drive nut is rotationally actuated to translationally move the valve stem within the valve.

16. The valve of claim 15, wherein the combination threaded-splined section extends for an entire axial length of a threaded portion of the valve stem.

17. The valve of claim 15, wherein the combination threaded-splined section extends for less than an entire axial length of a threaded portion of the valve stem.

18. The valve of claim 15, further comprising:
a bonnet that is coupled to the valve body by a plurality of threaded fasteners; and
a stepped recess defined in the bonnet, the stepped recess comprising a lower recess and an upper recess positioned above the lower recess, the upper recess having a larger diameter than a diameter of the lower recess, wherein the anti-rotation ring is positioned within the lower recess and at least a portion of the drive nut is positioned in the upper recess.

19. The valve of claim 18, further comprising:
a plurality of threaded fasteners that couple the anti-rotation ring to the bonnet;
a cover plate positioned above the upper recess, wherein a portion of the drive nut extends through an opening in the cover plate; and
a plurality of threaded fasteners that couple the cover plate to the bonnet.

20. A valve, comprising:
a body;
a valve stem comprising a combination threaded-splined section and an unthreaded section, the combination threaded-spline section comprising a single spline that defines a partial ring thread segment that extends partially around an outer perimeter of the combination threaded-splined section;
an anti-rotation ring comprising a single tab that is positioned in the single spline of the combination threaded-splined section; and
a threaded drive nut that is adapted to engage the partial ring thread segment of the combination threaded-splined section, wherein at least a portion of the partial ring thread segment defined by the single spline comprising the combination threaded-splined section is adapted to translationally move through a first end of the anti-rotation ring and exit out a second end of the anti-rotation ring when the threaded drive nut is rotationally actuated to translationally move the valve stem within the valve.

21. The valve of claim 20, wherein the combination threaded-splined section extends for an entire axial length of a threaded portion of the valve stem.

22. The valve of claim 20, wherein the combination threaded-splined section extends for less than an entire axial length of a threaded portion of the valve stem.

23. The valve of claim 20, further comprising:
a bonnet that is coupled to the valve body by a plurality of threaded fasteners; and
a stepped recess defined in the bonnet, the stepped recess comprising a lower recess and an upper recess positioned above the lower recess, the upper recess having a larger diameter than a diameter of the lower recess, wherein the anti-rotation ring is positioned within the lower recess and at least a portion of the drive nut is positioned in the upper recess.

24. The valve of claim 23, further comprising:
a plurality of threaded fasteners that couple the anti-rotation ring to the bonnet;
a cover plate positioned above the upper recess, wherein a portion of the drive nut extends through an opening in the cover plate; and
a plurality of threaded fasteners that couple the cover plate to the bonnet.

* * * * *